United States Patent [19]

Packard et al.

[11] 4,183,472
[45] Jan. 15, 1980

[54] COMBINATION HAY-GRAIN FEEDER DEVICE

[75] Inventors: Charles E. Packard, Estherville, Iowa; William M. Maas; Robert J. Seims, both of Fairmont, Minn.

[73] Assignee: Art's-Way Manufacturing Co., Inc., Armstrong, Iowa

[21] Appl. No.: 932,199

[22] Filed: Aug. 8, 1978

[51] Int. Cl.$^2$ ............................................. B02C 23/00
[52] U.S. Cl. ............................ 241/200; 241/101 A; 241/152 A; 241/223; 241/186 R; 198/533; 198/611
[58] Field of Search .......... 241/101 A, 152 A, 186 R, 241/186.2, 186.4, 200, 223; 198/498, 533, 550, 557, 611

[56] References Cited

U.S. PATENT DOCUMENTS

| | | | |
|---|---|---|---|
| 2,710,097 | 7/1955 | Bolles | 198/557 X |
| 3,983,888 | 10/1976 | Edwards | 198/498 X |
| 4,034,920 | 7/1977 | Bradley | 241/200 X |

Primary Examiner—Richard B. Lazarus

Attorney, Agent, or Firm—Williamson, Bains, Moore & Hansen

[57] ABSTRACT

A bale and grain feeder device includes an elongate conveyor and table structure which is mounted on the mixer-grinder vehicle chassis. The conveyor and table structure may be positioned to discharge slabs of hay and loose grain into the hammer mill of the mixer-grinder vehicle to permit such material to be chopped or ground into small pieces. A feed chute positions the baled hay on a conveyor and table structure to permit conveyor chains having paddles thereon to rip away portions of the bale. The feed chute may be removed for use with small grains or ear corn. A slab feeder roll cooperates with the conveyor paddles to convey the slabs of hay along the table where the hay or grain is directed to the hammer mill by paddles. A finger roll is used in the inlet area to precisely control the rate at which the bale is fed downwardly. A cutoff roller positioned below the slab feeder roll and adjacent the discharge end of the conveyor is used to assist in further separating the conveyed material from the conveyor and from itself.

5 Claims, 7 Drawing Figures

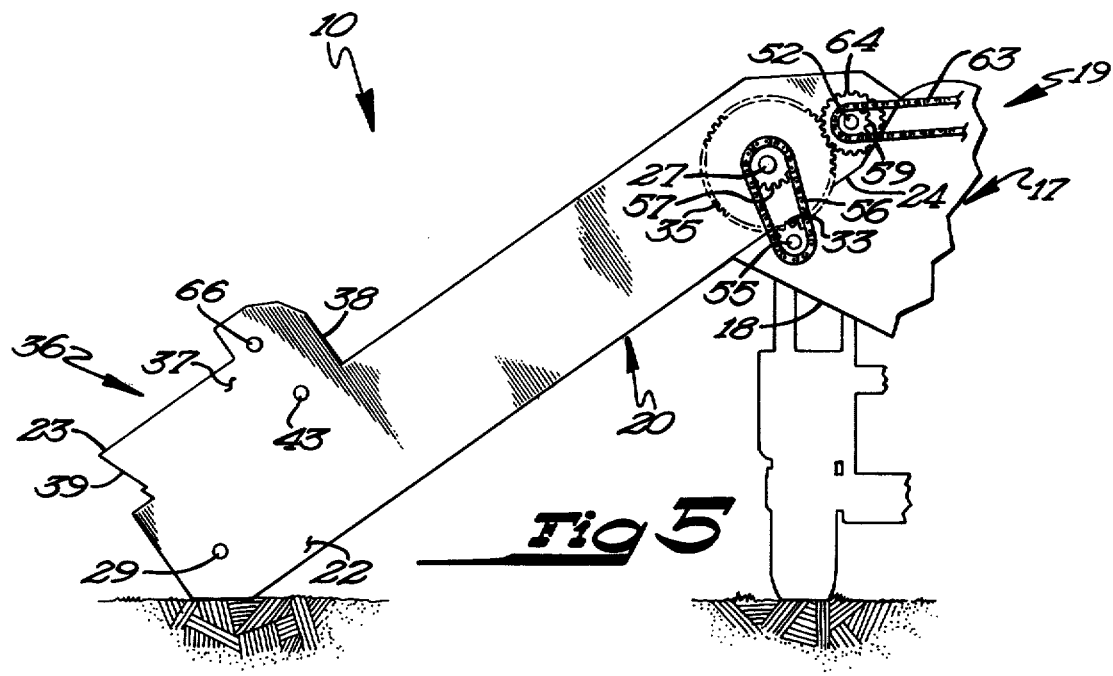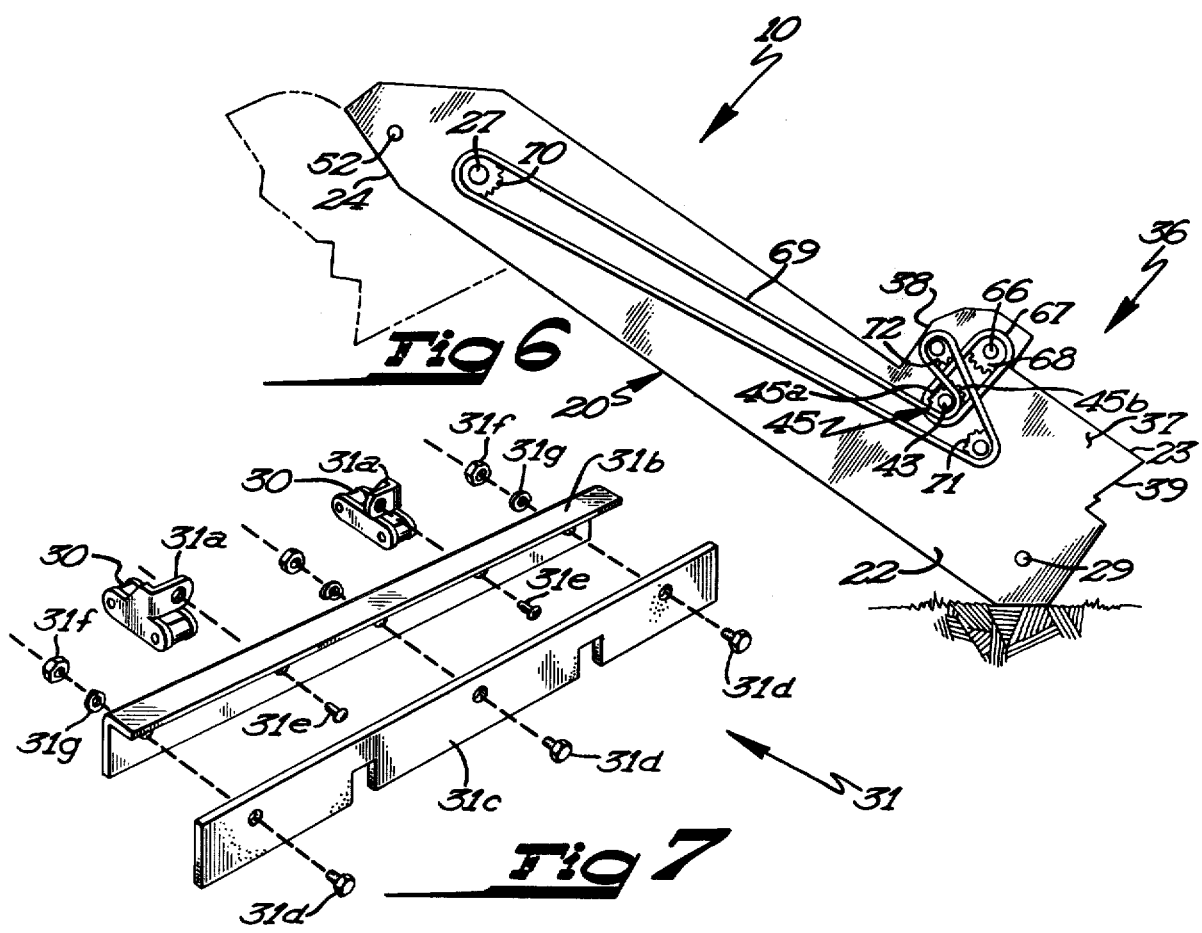

COMBINATION HAY-GRAIN FEEDER DEVICE

SUMMARY OF THE INVENTION

This invention relates to a bale and grain feeding device for use with a mixer-grinder vehicle of the type used in mixing and preparing feed for cattle and livestock.

When mixer-grinder vehicles are used in the preparation of cattle feed, quite often some of the food components are processed through the conventional hammer mill mounted on the vehicle to reduce the size of the food particles prior to mixing in the mixing tank. Baled hay is often used in preparing the cattle ration in order to provide a cheaper ration but it is necessary to separate the hay from its baled condition so that it may be processed through the hammer mill. Some devices have been developed for separating the hay from its baled condition and for feeding the hay into a mixer-grinder hammer mill. Some of these prior art devices involve the use of rotating blades as a means of separating the hay from the bale and directing the hay into a hammer mill. Devices using rotating blades, while providing a means for rapidly feeding the hay into the hammer mill, are quite dangerous.

Particularly, prior art devices such as U.S. Pat. No. 4,034,920 solve many of the problems of the prior art devices with the exception that the aforementioned patent is solely suited for feeding baled hay into the mixer-grinder devices. For balanced rations, it is desired to add small grains and ear corn to the feed mix and to do so would require disconnection and storage of the bale feeder device. Additionally, to feed the small grain or ear corn such material would either have to be lifted to the mixer-grinder device inlet or would require the use of a separate conveyor to do so. Such direct feeding is also less desirable from a safety standpoint.

It is therefore a general object of this invention to provide a mixer-grinder vehicle with a novel bale and grain feeding device which is not only efficient in feeding hay from a bale form into the hammer mill of the vehicle but such that the bale and grain feeder device is arranged and constructed so as to be convertible with a minimum of effort to feeding small grains, ear corn and the like. It is further an object to provide such a device which will minimize the occurrence of injury to an operator during the operation of the device.

In this respect, the bale feeder device includes an elongate conveyor and table structure which may be readily mounted on the vehicle chassis and which includes feed rolls and endless chain conveyors having paddles for effectively removing and directing grain and hay into the hammer mill. When the bale feeder device is not in use, it may be readily swung to an out-of-the-way position and supported entirely on the vehicle chassis.

These and other objects and advantages of this invention will more fully appear from the foregoing description made in connection with the accompanying drawings, wherein like reference characters refer to the same or similar parts throughout the several views.

FIGURES OF THE DRAWINGS

FIG. 5 is a side view of the device showing in particular the drive system.

FIG. 6 is a side view of the device showing the other side of the drive system.

FIG. 7 is a detail view of the chain, flap, and paddle construction.

DESCRIPTION OF THE PREFERRED EMBODIMENT

Figure 1:
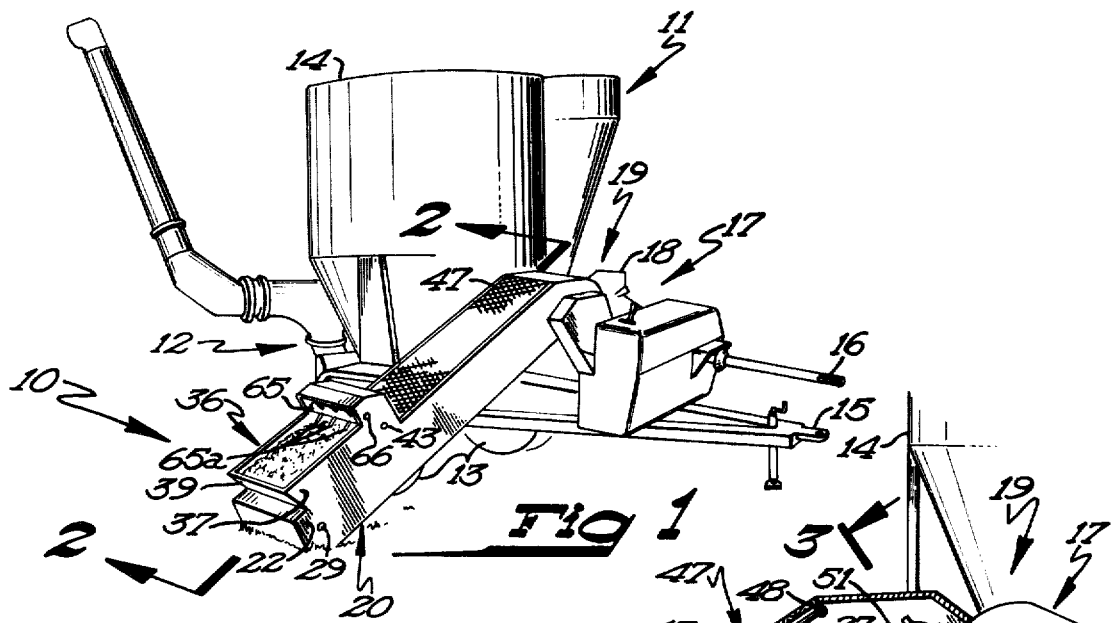
FIG. 1 is a perspective view of the grinder-mixer vehicle having a novel bale-grain feeder device mounted thereon.

Referring now to the drawings and more specifically FIG. 1, it will be seen that the novel bale-grain feeder device designated generally by the reference numeral 10 is mounted on the grinder-mixer vehicle 11. The grinder-mixer vehicle 11 includes a chassis 12 having ground engaging wheels 13 and having a mixing tank 14 mounted thereon. The chassis 12 is provided with a hitch 15 for connection to a prime mover such as a tractor or the like, and the vehicle is also provided with a power take-off shaft 16 for connection to the power take-off of the tractor. The grinder-mixer vehicle 11 is also provided with a hammer mill 17 including a hammer mill housing 18 having an inlet 19 through which material is directed for grinding by the hammer mill.

The feeder device 10 includes an elongate conveyor and table structure 20 which is comprised of an elongate substantially flat table 21 having vertically disposed side panels 22 fixedly connected thereto and extending vertically therefrom. It will be noted that the side panels 22 extend both above and below the table 21. Table 21 is provided with a material-receiving end portion 23 and a discharge end portion 24, the latter being positioned closely adjacent the inlet 19 of the hammer mill housing when the feeder device is positioned in an operative position.

It may be desired to have side walls 22 in a tapered arrangement due to the fact that the mixer-grinder inlet has a fixed dimension which may be less than a common bale of hay. Thus it is necessary that the inlet end 23 may be wider than the discharge end 24. Of course as the hay is chopped and conveyed, it will assume a loose enough condition that the tapering side walls will merely compress the hay somewhat over the course of the travel.

In this respect the conveyor and table structure 20 is fixedly mounted on the chassis 12 of the vehicle 11 by means of a sleeve 20A connected to the chassis, and a post 20B connected to one end of the conveyor and table structure 20. It will be noted that the sleeve 20A and post 20B are vertically disposed and permit the conveyor and table structure to be swung about a vertical axis between an inoperative position and an operative position. The conveyor and table structure may also pivot about the horizontal axis coinciding with shaft 52. It will be noted that while the conveyor and table structure 20 is disclosed as being in the operative position as shown in FIG. 1, it may also be swung to an inoperative position where the conveyor and table structure is supported upon the chassis of the vehicle and extend longitudinally thereon. When the conveyor and table structure is disposed in the operative position, the discharge end 24 of the table is positioned adjacent the inlet 19 of the hammer mill housing and the conveyor and table structure has its other end positioned upon the ground.

Figure 2:
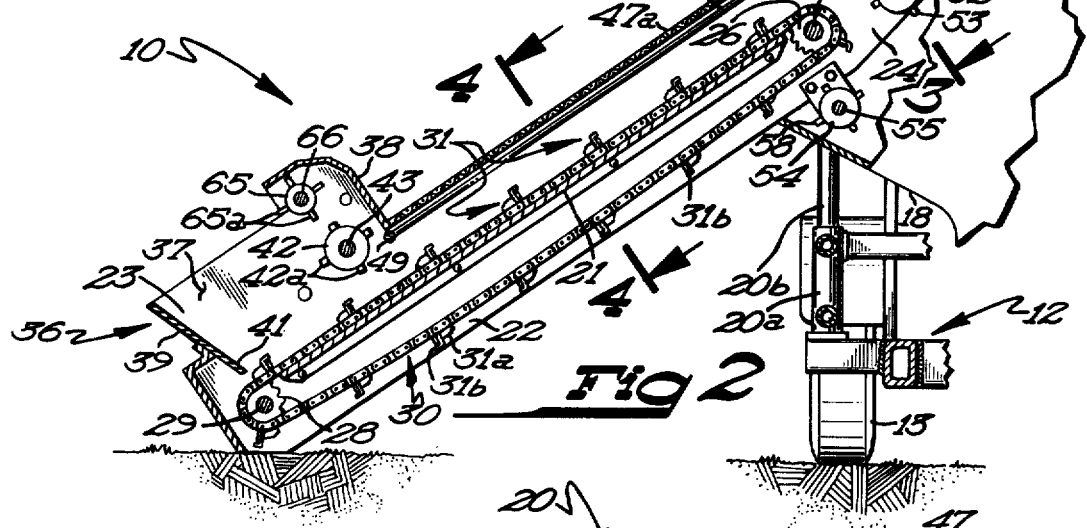
FIG. 2 is a sectional view taken along lines 2—2 of FIG. 1.

Drive sprockets 26 are provided adjacent the discharge end of the table and are secured to an axle 27 which is journaled in suitable bearings carried by the side panels. Driven sprockets 28 are provided adjacent the material-receiving end 23 of table 21 and are fixedly mounted on an axle 29 which is also journaled in the side panels 22. Endless conveyor chains 30 are chained about the drive and driven pairs of sprockets as best seen in FIG. 2. It will be noted that the sprockets 26 and sprockets 28 project through slots in the table so that the upper run of each chain is positioned upon the surface of the table. The chains 30 are each provided with a plurality of paddles 31 which project outwardly therefrom. As shown in FIG. 7, paddles 31 are comprised generally of attachment links 31a, paddles 31b and flaps 31c. Attachment links 31a fasten to chains 30 and have in turn fastened thereto paddle portion 31b and flap portion 31c. Paddle 31b is fastened to attachment links 31a by rivets 31e. Flap 31c is in turn fastened to paddle 31b by bolt 31d, nut 31f and lock washer 31g as shown particularly in FIG. 7. The paddle 31B is L-shaped in cross section and extends the full width of the narrow or outlet end 24. Flap 31c is preferably made of rubber and is sized so as to extend the full width of the material receiving end portion 23. Due to the taper of the side panels 22, it is necessary that rigid paddle 31b not extend the full width of the wider inlet end 23. This in turn causes the problem that at the wider end a clearance will form between the ends of paddle 31b and side panels 22 thereby allowing leakage of the material to be transported. It is desirable then to eliminate such a clearance and this is performed in the instant invention by use of rubber flaps 31c which will deflect as chain 30 travels toward the narrower end of the device thereby maintaining a reasonably good seal at all times and preventing grain from falling back towards the inlet end. Also, the use of rubber in this portion of the device cuts down on wear of side panels 22 by a plain steel paddle which would otherwise be utilized.

Means are provided for driving the endless conveyor chains 30 and to this end a chain 63 is connected to the power takeoff 16 from the tractor which is used by the mixer-grinder unit. Power takeoff chain 63 drives feed roll shaft 52 by way of sprocket 59. Feed roll shaft 52 is also journaled in side panels 22 and has located thereon adjacent to sprocket 59 further gear 64 which is directly engaged with conveyor chain drive gear 35 located on axle 27.

Means are also provided for positioning and holding a bale of hay at the material-receiving end portion 23 of the table 21 in a position so that the hay may be forcibly pulled from the table. This means includes a chute 36 having side walls 37 which are part of side panels 22 and project upwardly therefrom. A front wall 38 extends between and is rigidly secured to the side walls 37 of the chute 26. A rear wall 39 is positioned between the side walls 37 and is substantially shorter than a hay bale. A chute extension (not shown) may be added to assist in guiding bales.

The cross sectional size of the chute is slightly larger than the cross sectional size of a hay bale to thereby permit a bale of hay to be supported in the chute with one end thereof disposed downwardly towards or against the upper surface of the table 21. It will be seen that when a hay bale is positioned in the chute 36, the conveyor mechanism will forcibly rip portions or slabs of hay from the end of the bale and move the slabs of the hay in an upward direction along the table 21.

Means are also provided for preventing the conveyor from overfeeding the hammer mill, and to this end guide panel 41 is positioned within and is rigidly secured to the interior surface of the chute 36 adjacent the rear portion thereof. This guide panel engages the rear edge of the hay bale and acts to prevent the paddles 31 of the chain conveyors from engaging and forcibly removing excessive hay from the rear edge portion of the bale.

Also acting to prevent overfeeding of the hammer mill, is finger roll 65 mounted between side walls 37 of chute 36 near the top of front wall 38. Finger roll 65 is provided with a plurality of spine-like radial projections 65a which positively engage the hay bale and control the rate of feed into the area where paddles 31 will engage the bale. Finger roll 65 is mounted on finger roll shaft 66 and as hereinafter described finger roll shaft 66 is caused to rotate relatively slowly so as to accurately control the feed of the bale.

Figure 3:
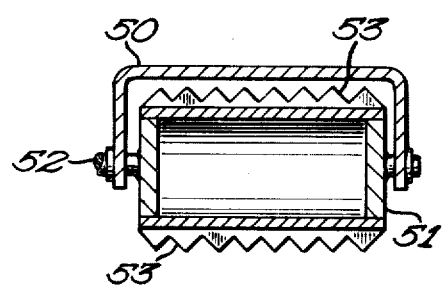
FIG. 3 is a sectional view taken along lines 3—3 of FIG. 2.
Figure 4:
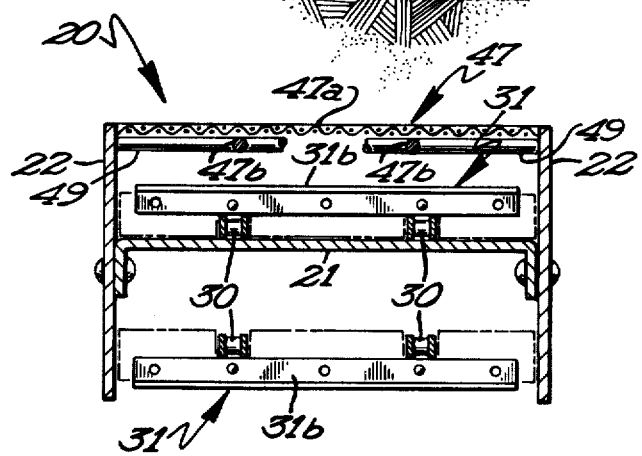
FIG. 4 is a sectional view taken along lines 4—4 of FIG. 2.

Means are also provided for further assisting continuous feeding of the slabs of hay upwardly along the table and such means include the slab feeder roll 42 which is positioned above the upper surface of the table and which is provided with an axle 43 journaled in the side panels 22 just forwardly of chute 36. The slab feeder roll 42 is of cylindrical configuration but is provided with a plurality of longitudinally extending elongate serrated blades 42a which project radially outwardly therefrom similar to those shown in FIG. 3. One end of axle 43 is provided with a double row sprocket 45. The larger sprocket 45b is connected via chain 67 to finger roll sprocket 68 located on finger roll shaft 66. The smaller sprocket 45a is connected by chain 69 to drive sprocket 70 located on conveyor shaft 27. Idler gears 71 and 72 serve to retain tension in the relatively long run of chain 69. The slab feeder roll 42 is rotated in a direction to impel or urge the slabs of hay continuously in an upward direction along the conveyor. Slab feeder roll 42 cooperates with the chain conveyors 30 and paddles 31 as well as with finger roll 65 to assure a continuous yet limited flow of hay material upwardly along the table 21. Of course it may be desired to provide a variable speed drive and to this end various interchangeable sprockets or v-belt drives as are well known may be utilized.

A guide 47 is positioned above the table and comprises a screen 47a and guide bars 47b which extend longitudinally and are fixedly connected at their front end to a transverse bar 48 and at their respective rear ends to a transverse bar 49. It will be noted that the transverse bars 48 and 49 extend between and are rigidly secured to the side panels 22. Guard 47 prevents hay and grain from spilling outwardly over side panels 22 and in particular guide bars 47b guide the movement of slabs of hay towards the discharge end of the table. It will be noted that the forward end of guard 47 extends below an arcuate guide plate 50 which extends between the side panels 22 adjacent the upper end of the table.

The grain and bale feeder device 10 also includes a feed roll 51 which is positioned forwardly of conveyor chains 30 and adjacent discharge end 24 of the table 21. It will be noted that the feed roll 51 is provided with an axle 52 which extends between and is journaled in the side panels 22. The feed roll is also provided with a plurality of longitudinally extending serrated blades 53 which are affixed thereto and project radially outwardly therefrom as shown particularly in FIG. 3. Blades on the cutoff roll 54, the slab feeder roll 42 and on the feed roll 51 facilitate positive movement of the hay minimizing any tendency of the hay to wrap around the roll. It will be noted that the underpassing arc of rotation of the feed roll 51 is just forward of the conveyor chains 30 so that cooperative action is produced between the conveyor chains and the feed roll 51 to impel the stream of hay or grain towards the inlet of the hammer mill housing. A cutoff roll 54 is also provided and is located immediately beneath the discharge end of conveyor chain 30 and associated axle 27. The purpose of cutoff roll 54 is to assist in separating the hay and grain from the conveyor 30 and associated paddles 31 as they leave the discharge area of the device. Often particularly hay will tend to cling to the paddles 31 as they round axle 27 and by providing a rotor having blades 58 which are similar in form to those shown in FIG. 3. Except that blades 58 are not serrated this will tend to pick off any bits of hay remaining and impel them in the direction of the discharge thus further acting to assist feed roll 52. At the point where blades 58 and paddles 31 pass adjacent to each other, they are traveling in the opposite direction thus further assisting in the picking and cleaning action. Cutoff roll 54 is located on axle 55 which is also journaled in side plates 22. Sprocket 57 is located on conveyor shaft 27 and drives sprocket 33 located on axle 55 by means of a chain 56 connecting the two.

During the operation of the grain and bale feeder device 10, a hay bale will be positioned on the chute 36 so that one end of the bale is positioned adjacent the table 21. Upon actuation of the power train finger roll 65 will slowly rotate and spines 65a thereon will impale the hay bale providing positive engagement and allowing the exact rate of feed to be controlled. As the bale is moved downward, the paddles 31 on the conveyor chain 30 will rip into the end portion of the bale and will continuously remove the slabs of hay therefrom and impel the slabs along table 21. The slab feeder roll 42 will be rotated and cooperative with the conveyor chains 30 and associated paddles 31 to continuously move the hay upwardly along the table from the material-receiving end towards the discharge end. The guard 47 and in particular guide bars 47b prevent hay from overflowing the side panels 22. The feed roll 51 will be driven in such a manner as to cause hay to be impelled downwardly through the discharge end of the machine. Cutoff rotor 54 rotates against the direction of travel of the conveyor chain 30 in order to clean chain 30 and paddles 31 of any hay might tend to be carried back towards the material-receiving end thereby preventing blockage and plugging. Cutoff rotor 54 also serves to assist in propelling the hay or other material downwards thru the discharge end of the machine. The guide panel 41 at the material-receiving end prevents the rear portion of the bale from being engaged by the paddle and thereby assists the finger roll in controlling the amount and rate of hay feed to be delivered along the table by the conveyor chains 30 and the slab feeder roll 42.

For use in feeding ear corn and other small grain into the mixer vehicle, the rear wall extension (not shown) of chute 36 is removed thereby providing a more easily accessible inlet to the feeder mechanism. As the ear corn and/or grain is fed in, it is carried upwardly by the paddles along the table and thence propelled over the edge with the assist of feed roll 51 at the discharge end thereof.

The hay and grain will be directed into the hammer mill and the strands of hay will be chopped into relatively small pieces and will thereafter be directed by suitable conveyor means to the mixing tank 14.

It will be seen that by utilizing the endless conveyor chains along with the feed rolls, there is little if any chance of injury from operation of these components. The present bale and grain feeder device does not use any rapidly rotating knives, but the particular arrangement of the chute and conveyor chains along with the finger roll and slab feeder rolls assures continuous and positive feeding of hay from the bale into the hammer mill.

It may be desired to provide a safety clutch operable near material-receiving end 23 whereby an operator may immediately disengage all moving parts in case of blockage or the like. Any well known clutch mechanism may be utilized to accomplish the above desired result.

Thus it will be seen that the novel bale and grain feeder device is not only of simple and inexpensive construction but is also one which functions in a more efficient manner than any heretofore known and comparable device.

While the preferred embodiments of the present invention have been described, it should be understood that various changes, adaptations and modifications may be made therein without departing from the spirit of the invention and the scope of the appended claims.

What is claimed is:

1. A feeder device for use with a grinder-mixer apparatus, said device including:

an elongate substantially flat table structure having a material-receiving end and a discharge end, an elongate endless conveyor mechanism mounted on said table and extending longitudinally thereof and having bale engaging elements thereon for engaging a bale of hay and having means to continuously forceably rip slab portions of hay from the bale and convey hay and grain towards said discharge end, a feed chute mounted on said table structure adjacent said material-receiving end and projecting upwardly therefrom, said feed chute having a cross section sized to receive a bale of hay therein and located to position the bale so that one end of the bale is disposed closely adjacent the table structure, a driven intake feeder roll having a plurality of serrated blades affixed thereto and extending outwardly therefrom mounted on said table structure closely adjacent and forwardly of said feed chute and being positioned above said conveyor, said driven intake feeder roll cooperative with said conveyor mechanism to cause portions of feed to be conveyed toward said discharge end, a driven finger roller mounted in one side of said chute parallel to and above said feeder roll, said finger roller having a plurality of spike-like fingers which impale the material to be conveyed and force the material generally perpendicularly towards said conveyor and which controls the rate of downward feed of the material onto the conveyor, a driven discharge feed roller mounted on the table structure adjacent the discharge end and cooperating with said conveyor mechanism to cause material to be fed into a hammer mill.

2. The feeder device of claim 1 further comprising a plurality of paddles located transversely of and attached to said conveyor mechanism to continuously convey longitudinally ear corn and small grains, as well as hay.

3. The feeder device of claim 2 further comprising a driven cutoff roller having a plurality of blades affixed thereto and extending outwardly therefrom, said cutoff roller being mounted below and adjacent the discharge end of said table structure and driven so that the ends of said blades pass closely adjacent to and in the opposite direction from said paddles so as to effect a cleaning action thereby preventing blockage and plugging as well as preventing material from being carried back towards said material receiving end.

4. The device of claim 1 and having a plurality of elongate guide bars positioned above the upper surface of said table structure and preventing material from spilling from said table structure.

5. The device of claim 1 and a panel affixed to the interior of said chute and projecting forwardly therefrom and serving to space the lower rear edge of the material from said chain conveyors.

* * * * *